US006292092B1

(12) United States Patent
Chow et al.

(10) Patent No.: US 6,292,092 B1
(45) Date of Patent: Sep. 18, 2001

(54) SECURE PERSONAL IDENTIFICATION INSTRUMENT AND METHOD FOR CREATING SAME

(75) Inventors: Sherman M. Chow, Sittsville; Nur M. Serinken, Kanata; Seymour Shlien, Ottawa, all of (CA)

(73) Assignee: Her Majesty the Queen in right of Canada, as represented by the Minister of Communication, Ottawa (CA)

( * ) Notice: Subject to any disclaimer, the term of this patent is extended or adjusted under 35 U.S.C. 154(b) by 1173 days.

(21) Appl. No.: 08/643,961

(22) Filed: May 7, 1996

Related U.S. Application Data

(63) Continuation of application No. 08/197,199, filed on Feb. 16, 1994, now abandoned, which is a continuation-in-part of application No. 08/019,589, filed on Feb. 19, 1993, now abandoned.

(51) Int. Cl.$^7$ ...................................................... H04Q 1/00
(52) U.S. Cl. ............................. 340/5.6; 340/5.53; 235/380
(58) Field of Search ........................ 340/825.31, 825.34; 380/23; 382/2, 11; 235/456, 380

(56) References Cited

U.S. PATENT DOCUMENTS

| 4,055,833 | * | 10/1977 | Rothfjell | 382/2 |
|---|---|---|---|---|
| 4,179,686 | * | 12/1979 | Bonicalzi | 340/825.34 |
| 4,180,207 | * | 12/1979 | Lee | 382/2 |
| 4,213,038 | * | 7/1980 | Silverman | 340/825.34 |
| 4,467,209 | | 8/1984 | Maurer . | |
| 4,811,408 | * | 3/1989 | Goldman | 340/825.34 |
| 4,822,990 | * | 4/1989 | Tamada | 340/825.31 |
| 4,972,476 | * | 11/1990 | Nathans | 340/825.31 |
| 4,975,960 | * | 12/1990 | Petajan | 382/2 |
| 5,027,113 | * | 6/1991 | Bonnaval-Iamothe | 340/825.34 |
| 5,050,212 | * | 9/1991 | Dyson | 340/825.31 |
| 5,218,644 | * | 6/1993 | Baver | 382/2 |
| 5,276,311 | * | 1/1994 | Hennige | 235/380 |
| 5,321,751 | * | 6/1994 | Ray | 380/23 |
| 5,505,494 | * | 4/1996 | Belluci et al. . | |
| 5,636,012 | * | 6/1997 | Belluci et al. . | |

* cited by examiner

*Primary Examiner*—Brian Zimmerman
(74) *Attorney, Agent, or Firm*—Shapiro Cohen

(57) ABSTRACT

A personal identification instrument is comprised of a substrate, and carried on the substrate: a photograph and/or a personal signature, personal information relating to the legitimate holder of the instrument, and an encrypted machine readable security code carried by the instrument, the code being comprised of a combination of digitized personal information and a digitized descriptor of the photograph and/or personal signature.

9 Claims, 4 Drawing Sheets

SECURE PERSONAL IDENTIFICATION INSTRUMENT AND METHOD FOR CREATING SAME

Figure 1:
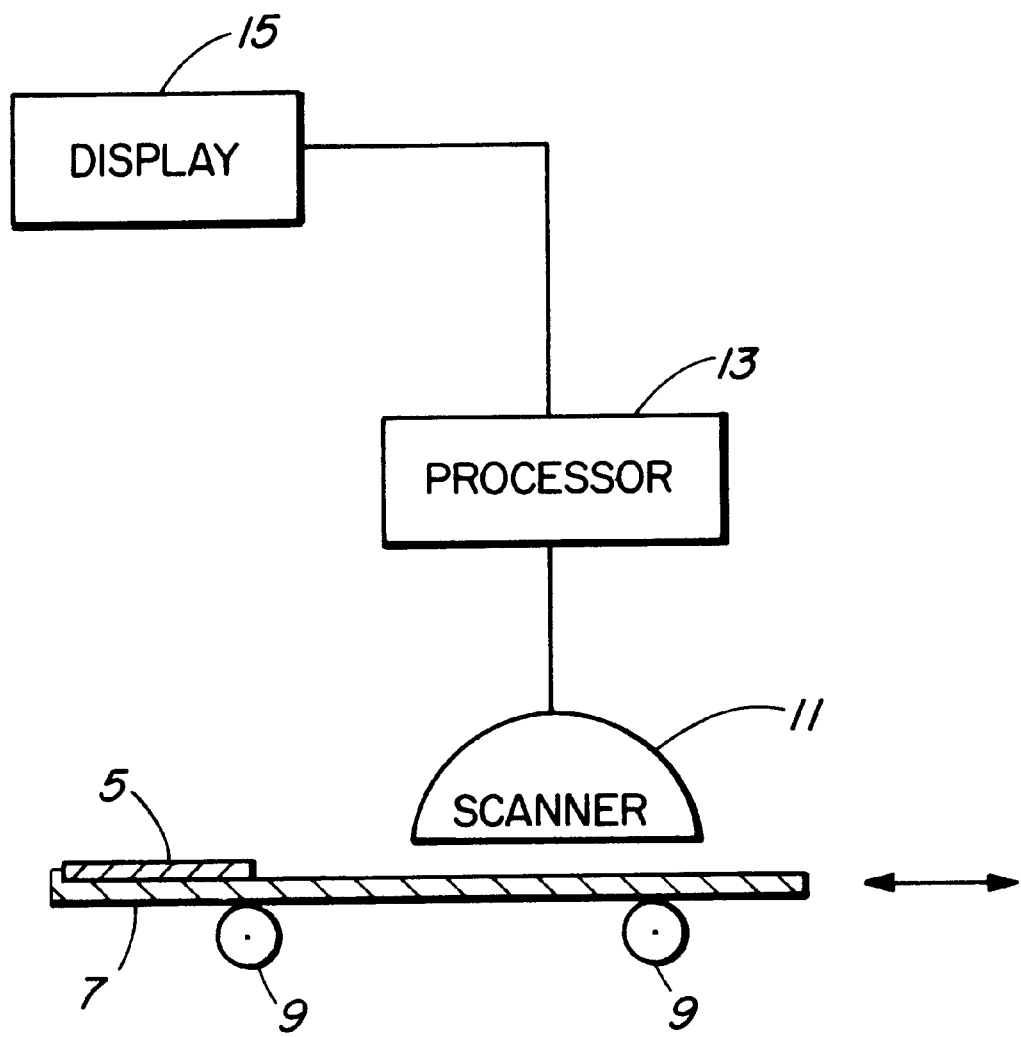

This is a continuation of application Ser. No. 08/197,199 filed Feb. 16, 1994 now abandoned which is a continuation-in-part of application Ser. No. 08/019,589, filed Feb. 19, 1993 now abandoned.

FIELD OF THE INVENTION

This invention relates to personal identification instruments and in particular to an instrument and method of creating such an instrument which has a high degree of security from fraud.

BACKGROUND TO THE INVENTION

Personal identity instruments are widely used in society, e.g. passports, credit cards, driver's licences, building passes, etc. Such instruments are very valuable, and therefore are often illegally fabricated or stolen and altered so that they can be used fraudulently by another person. Such an instrument ideally should be useless in the hands of another person.

In order to make an instrument more difficult to counterfeit or use by another person, it bears the signature and sometimes a photograph of the owner of the instrument. A security guard, cashier, customs agent, etc. typically verifies the picture visually with the face of the user, sometimes also requests a signature for comparison with the signature on the instrument, and by that means verifies the authenticity of the instrument.

However such instruments are subject to fraud. It is possible to make a fake instrument from a stolen document or card containing a different photograph, matching the fraudulent holder.

U.S. Pat. No. 5,027,113 describes a process and apparatus for making a personal identification instrument which is subject to machine verification. An instrument according to that patent is first made carrying e.g. indicia and/or a photograph, and deviations from a standard of the outlines of at least some of the indicia (on a magnified scale) are stored in a memory. When an instrument is presented, a machine reads the exact outline of corresponding indicia. Since paper fibers, ink bleeds, etc. result in a different outline than the original, the machine comparing the deviation data with the originally stored outline deviation data can result in the declaration of a fraudulent instrument.

Similarly, for verification of a photograph, the entire photograph is read by a camera. The variation of the distribution of grey levels in the image scanned by the camera, as compared with stored data describing the variation of the distribution of grey levels, stored from the original authentic photograph, can result in detection of a fraudulent instrument.

Unfortunately the system described in the patent requires storage of a large amount of data for each instrument, which becomes very large when photograph data are stored. In addition, each verification station requires access to the stored data. While the data can be stored in a centralized data bank, verification requires the transfer of very large amounts of data along transmission lines from the central data bank to the verification stations. Where there is a continuous flow of persons to be authenticated, for example where many millions of passport-holding persons are subject to verification at any of hundreds of border points spanning very long borders (e.g. the border between the United States and Canada, the border between the United States and Mexico) the cost of using such a system becomes prohibitive.

SUMMARY OF THE PRESENT INVENTION

The present invention provides a means for realizing a personal identification instrument which has extremely high security, and is virtually immune to falsification. There is no need for storage of massive amounts of any data at any central location nor of transmission of any data; all of the verification data is carried on the instrument itself. Each verification station need only contain a processor capable of processing an algorithm and a scanner for scanning the instrument and reading data from the instrument into the processor.

In accordance with an embodiment of the invention a personal identification instrument is comprised of a substrate, and carried on the substrate are a photograph and/or a personal signature, personal information relating to the legitimate holder of the instrument, and an encrypted machine readable security code carried by the instrument, the code being comprised of a combination of digitized personal information and a digitized descriptor of the photograph and/or personal signature.

In accordance with another embodiment of the invention, a method of creating a personal identification instrument on which personal data and a picture and/or signature of a legitimate holder are retained, is comprised of acquiring a first digital representation of the picture and/or signature of a legitimate holder of said instrument, extracting first feature data from the digital representation, reading the personal data, combining the feature data with the personal data into a single data sequence and generating a security code by encrypting the sequence with a secret key, and affixing the security code to the instrument to provide a substantially forgery-proof instrument.

BRIEF INTRODUCTION TO THE DRAWINGS

Figure 2:
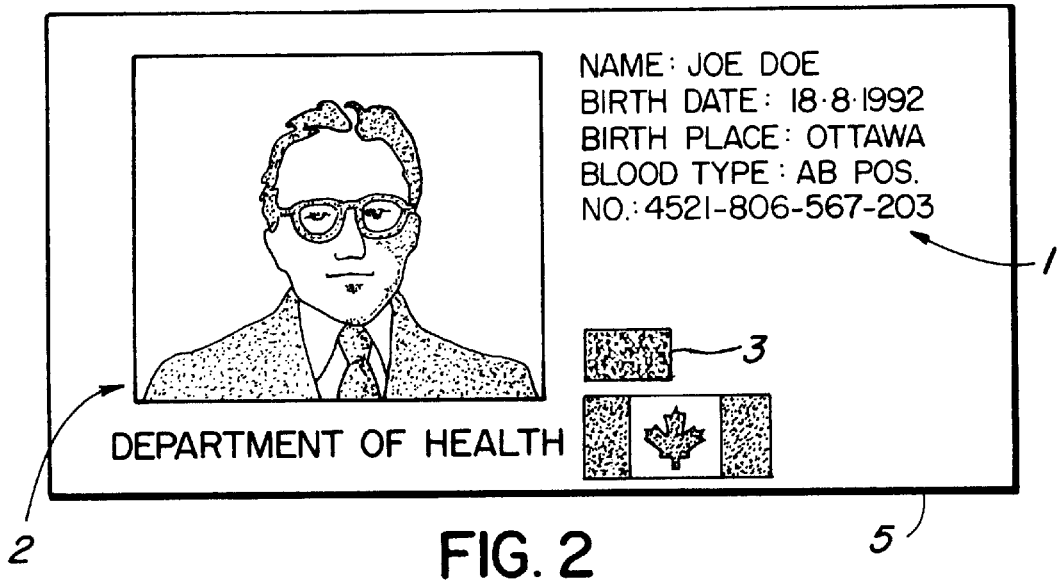
Figure 3:
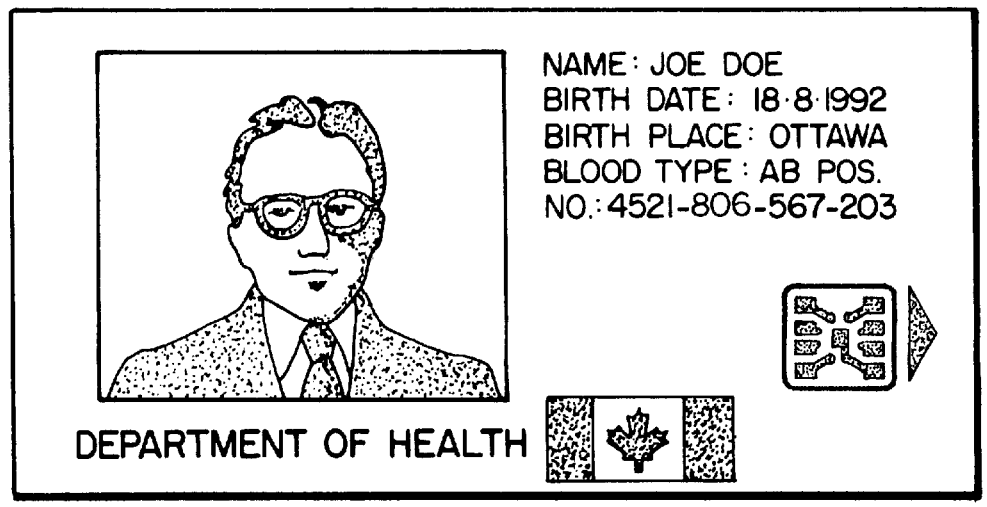
Figure 4:
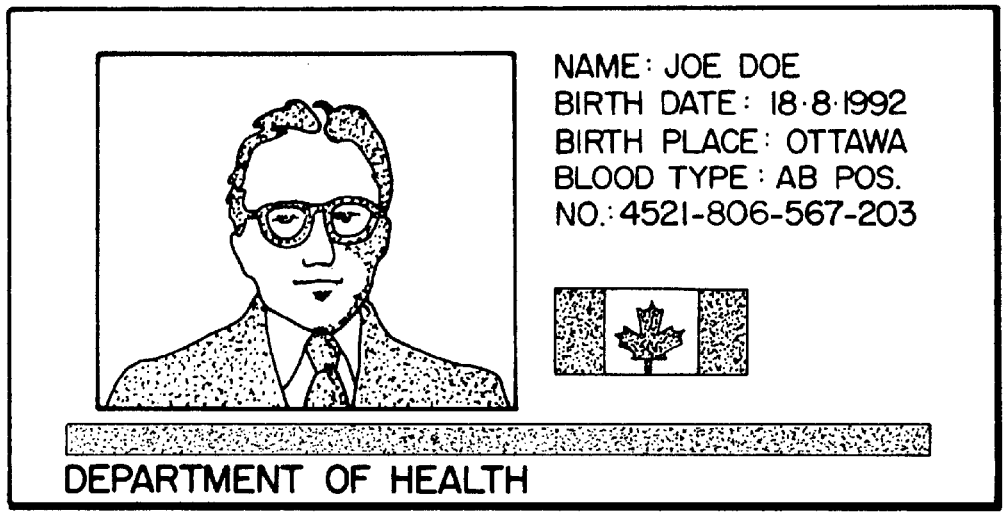
Figure 5:
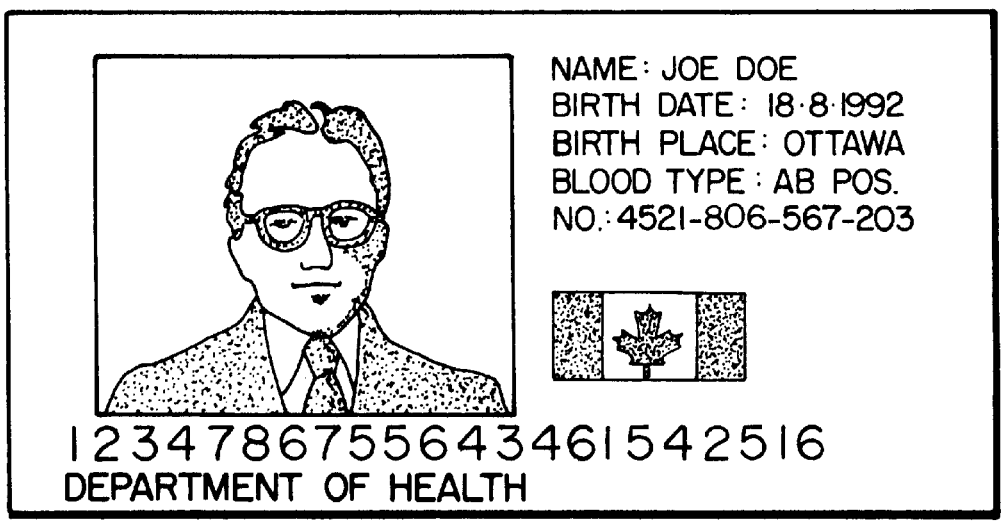
Figure 6:
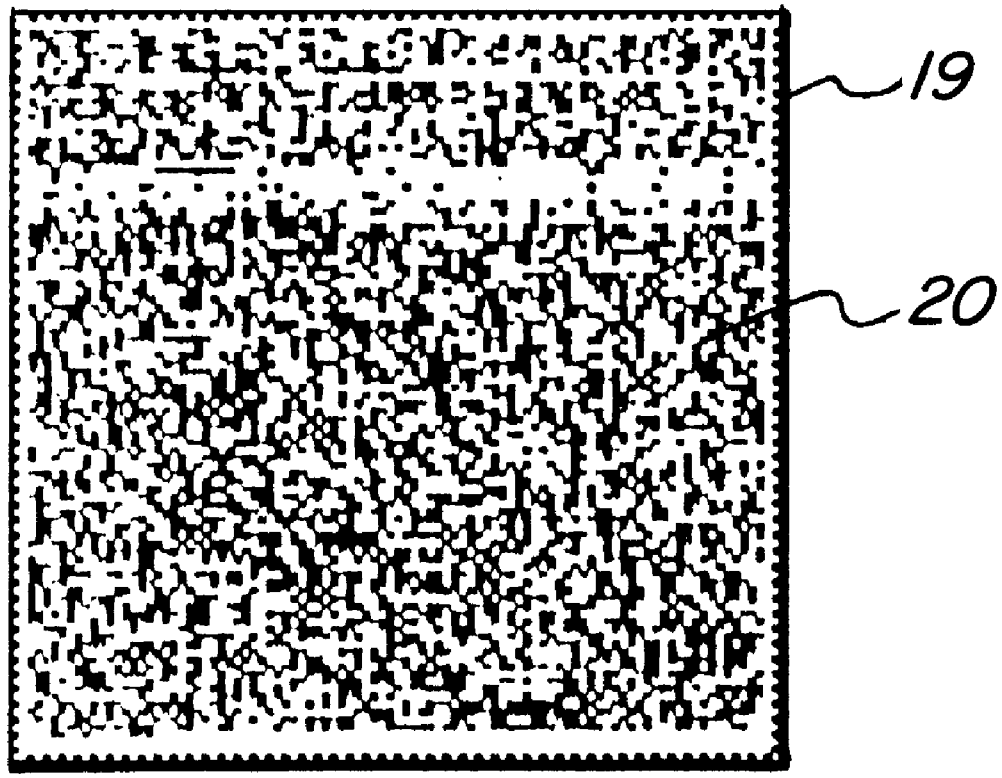

A better understanding of the invention will be obtained by reference to the detailed description below, in conjunction with the following drawings, in which:

FIG. 1 is an apparatus that can be used to read a personal identification instrument, FIG. 2 illustrates a face of an instrument in accordance with a first embodiment, FIG. 3 illustrates a face of an instrument in accordance with a second embodiment, FIG. 4 illustrates a face of an instrument in accordance with a third embodiment, FIG. 5 illustrates a face of an instrument in accordance with a fourth embodiment, and FIG. 6 illustrates an imprinted carrier on which is imprinted an encoded matrix in accordance with another embodiment of the invention.

DETAILED DESCRIPTION OF THE INVENTION

Turning first to FIGS. 2, 3, 4 and 5, a personal identification instrument is divided into three areas: area 1 which contains biographical data of the legitimate holder of the instrument, area 2 which contains either or both of a picture and signature of the legitimate holder of the instrument, and area 3 which contains authentication information.

The main difference between the embodiments of FIGS. 2–5 is in the storage of the authentication information: in FIG. 2 it is in the form of a two-dimensional bar code, in FIG. 3 the information is stored in an integrated circuit chip, in FIG. 4 it is stored in a magnetic stripe, and in FIG. 5 it is stored in an OCR code.

The design geometry of areas 1, 2 and 3 do not have any significance in the present invention. They can be arranged in a book form or in a one or two-sided card form, depending on the requirements of the application.

The biographical data in area 1 should be in a human readable form, that can be electro-optically read by validation equipment at the authentication station. The subject matter in areas 2 and 3 can be in human readable form but should be in machine readable form.

When producing the authentication information for area 3, data bits from area 1 and area 2 should be passed through an encryption algorithm to form a security code which should be affixed in e.g. one of the forms shown in FIGS. 2–5 on the instrument.

Modern encryption algorithms such as symmetric or asymmetric key systems can provide means for protecting the data stored in area 3. Even though such algorithms become public domain, it is extremely difficult for someone to decode the data without knowing the secret key used in the encryption. Millions of years of computer time have been estimated to be required to break some of the encoding schemes. The particular encoding scheme used is not particular to this invention, so long as it is encrypted.

Since the encoded information is dependent on the photograph and other information on the instrument, it is extremely difficult to alter the information or photograph on the instrument without escaping detection, even though the method of validating the instrument may be known to the public. For example, it would be next to impossible for a person to generate a new encrypted code for the instrument based on modified information on the instrument without knowing the secret key used by the encryption scheme.

It would be difficult to generate a photograph of a person with the same information that is embedded in encrypted information affixed to the card. It is likely that the new photograph would be obviously different from the desired holder of the instrument and furthermore, the name, age and height (blometric information) of the person encoded also likely would not match.

The number of bits contributed by area 2 to area 3 in accordance with one embodiment of this invention is in the order of 100 bits. The contribution from area 1 to area 3 can be from a few bits to thousands of bits. If the information output of the biographical area is too large to fit into the bit space allocated in the authentication area, the information can be passed through a one way cryptographic hash function to limit this contribution to allocated bit space.

The tamper proof instrument can be copied or transmitted; if the copies are of high quality (reproduction of colour, resolution, dimensions, brightness, contrast, etc.), then the copies will have the same attributes as the original. Copies can be authenticated since no alterations will have been made on them. Indeed, the whole document can become image area 2, and there may be no contribution from area 1; or vice versa, full contribution from area 1 and no area 2, area 3 will constitute the descriptor of the whole document.

As one example, area 3 can contain 640 bits. Where, for example, as in FIG. 2 the information stored in area 3 is in the form of a two-dimensional, high density, bar code, 640 bits can be stored in an area occupied by a postage stamp. This can be divided to store 128 bits of the image (area 2) and 496 bits from the biographical data (area 1) plus 16 bits of error protection.

FIG. 1 illustrates in block diagram a typical system which can be used to encode or authenticate the instrument. The instrument 5 can be placed on a table 7 which is moved in the directions of the arrow by means of motor driven rollers 9 or pulled by hand. As the table moves to the right, it carries the instrument 5 under scanner 11. The sampled image data is passed into processor 13, to which a display 15 is connected.

Many commercial scanners or video cameras can serve to acquire a digital representation of a surface of an instrument. For example a flat bed scanner such as Hewlett Packard Model IIc Scanjet can be used. Such a scanner produces a grey level black and white image of the picture to a resolution to 150 dots per inch, which has been found to be adequate for most applications. However the present invention is intended to include all possible means of acquiring the data, including colour data.

The processor executes algorithms, such as described below, to extract data from the photograph. It may be necessary, for some applications to include algorithms to find the location of the picture due to placement inaccuracies.

The algorithm extracting the information from the picture is preferred to extract global features from the picture, i.e. not local to any specific position in the picture but which depend on its overall characteristics. These features make very little assumptions regarding the contents of the image, so that they will still work if the image does not contain a face. However the algorithm is preferably optimized for the more usual situation where the photograph does contain a face. About 10 features are preferred to be extracted, which are encoded as small numbers. Concatenating the bits of these features produces a 50 to 128 bit number which is associated with the photograph.

The features are preferably computed by taking weighted averages. As the weighting functions are highly non-linear, it is very difficult to create an image which would have the same averages and yet the image contain a face or signature of a specific person. These features are only based on the luminance (black and white) components of the picture; however the present invention is not restricted and could cover colour components if this were necessary or desirable. Any generic scheme for extracting local or global features from a picture can be used.

One specific algorithm will be described in more detail below.

The next step in the process is to input other personal information for area 1, such as the age, height, colour of eyes, birth date, birth place, etc. of the authentic holder of the instrument. This is preferably read from an imprint already on the card, although instead it could be input on a keyboard. Ideally, the information should describe unalterable properties of the person. The validation machine could display this information to the validation station user if a one-way hash function is not used.

The image is applied to the document by direct recording or by attachment of image material to the instrument. The image that is part of the instrument in area 2 is recorded in human visible form and is acquired by the electro-optical means (e.g. by the scanner) from the instrument.

The combination of the personal information and a digitized descriptor of the photograph and/or personal information forms a code, which after encrypting using a secret key is recorded in area 3 on the instrument in any reliable machine readable form, for example any of the forms shown in FIGS. 2–5.

The encryption algorithm used in processor 13 can use private and/or public key encryption techniques. These techniques are well known in literature; examples are Data Encryption Standard (DES) for private key and Rivest Shamir Adleman (RSA) algorithm for public key techniques.

The resulting personal identification instrument is as shown in FIGS. 2–5.

To authenticate the information, a system such as that shown in FIG. 1 can be used. The instrument 5 is placed on table 7 and is passed under scanner 11. The biographical information is acquired from the recorded area 1 of the document, and is converted into binary format in processor 13 as was done in the document creation process and is saved in a local memory.

The image in area 2 of the instrument is acquired in a similar manner, and is processed by the image processing algorithm, to extract image descriptors. It is preferred that this is done by calculating weighted averages, as will be described below. The image descriptors are also saved in a local memory.

The information stored in area 3 is read and is decrypted using the public decryption key. The binary vector resulting from the decryption is separated into two parts. The part containing the biographical data is compared to the biographical data that was read from the area 1 of the instrument, and if there is any discrepancy between the two sets of biographical data streams, the document is declared as a fake.

If the biographical data test is positive, then a distance measure is applied between the image descriptor that is generated at the authentication stage, and the decrypted image descriptor from the information stored in area 3. If the distance measure is greater than a predetermined limit, the document is declared as a counterfeit.

Clearly if the image has been altered or if the data stored in area 1 of the instrument has been changed, this will not match the decrypted codes stored in area 3. A forger would be unable to produce a correctly matching code for application to area 3, since the encryption key is secret. Even if the encryption and decryption algorithms are known, the correct code for area 3 would not be able to be produced, since the key used in generation of area 3 remains a secret.

The aforenoted one-way hash function, (which is also known as a message digest algorithm or manipulation detection code), is a message of variable length and provides a fixed length code. It appears to be computationally infeasible to find two different messages with the same output code, if this code is larger than 64 bits. With this property, if the input is altered in any way, it will be detected by a mismatch of the output code generated. The detection process in the authentication station is required only to detect the presence of the manipulation, but not the location or magnitude or of the manipulation.

With regard to the photograph, such a photograph on an identification card is typically 1" by 1¼". Digitized to a resolution of 300 dots per inch in three colours, this would cause the picture to occupy 300×375×3×8=2.7 million bits. Even using shades of grey, the amount of data representing a photograph is huge. The prior art U.S. Pat. No. 5,027,113 referred to above requires the storage and transmission of bits of a photograph of this magnitude for every expected instrument to be verified.

The present invention dispenses with verification of the entire photograph, and instead utilizes selected features. Different features differ in the amount of sensitivity (for distinguishing nearly similar pictures) and robustness to environmental changes that can occur due to the changes in the photograph or scanner.

It has been found that the digitization of a picture by a scanner is not a repeatable operation. On a gross scale the digitized pictures should appear the same, but in the fine scale there will be small variations for various practical reasons. For example, it is unlikely that the position of the picture will be exactly the same due to the various mechanical tolerances in the scanning equipment.

In addition, the picture on an identification card or passport will probably be scanned on many different authentication machines. These machines may be produced by different manufacturers using different components. Furthermore, machines of the same manufacturer may differ or depart from standard calibration due to aging and use. This will introduce other variations in the digitized data. Exposure of colour photographs to ultraviolet rays also causes slow fading of the picture.

Many parts of the picture may contain useless information. For example, a person in the photograph typically is in front of a featureless background. Although the encoding technique may use some of the information in the background, it should provide greater weight to the foreground information.

Photographs in passports are in many cases black and white. Black and white pictures provide more definition and are more robust to environment changes. It is preferred in the present invention, to convert all scanned pictures to black and white. The conversion of colour photographs to black and white often results in loss of contrast. The feature extraction technique used in the present invention should be robust enough to handle this loss in contrast.

It is preferred that the feature extraction, both in the encoding system and in the decoding system should follow the following preferred steps.

The image should be acquired by electro-optical means. The resolution of the scanned image should be reduced to about 100 dots per inch if it were digitized at a higher resolution. If the digitized picture is in colour, the luminance component should be extracted and the hue and saturation components discarded.

The area of the digitized document where the photograph is located should be determined. The picture could always be located in one place, to a high tolerance, or the position could be located automatically, either from datum points or from an analysis algorithm.

The digitized image should then be converted from as many grey levels as the equipment provides (e.g. typically 256), to 3 grey levels. The weighted averages of the dark component in the multi-tone average should then be computed. The weighted averages of the light component in the multi-tone image should then be computed. The averages should then be encoded into a number with a fixed number of bits.

One way of digitizing the picture is to represent it as a two-dimensional array of numbers or pixels where the dimensions of the array depend on the size of the picture. Let $P(i,j)$ denote the value of that pixel located at the i-th row and j-th column of this array. In a successful prototype system, the dimensions of the array were 64 by 64, which was achieved by a suitable selection for scanning parameters and by cropping the edges of the picture. Each pixel element took a value between 0 and 255 where low values denoted a dark pixel and high values denoted a bright pixel.

To correct the continuous tone image to a three tone image, each pixel in the array $P(i,j)$ was assigned a new value, either 0, 1 or 2 depending upon the original value of that pixel. The 0 value was assigned to all dark pixels whose original intensity level lay within a range of 0 to THR1 inclusive where THR1 is some threshold value selected. The 2 value was assigned to all bright pixels whose intensity level lay between THR2 and 255 inclusive where THR2 is a higher threshold. The 1 value was assigned to all the remaining pixels.

The choice of these thresholds THR1 and THR2 depends upon the specific image and the manner in it was scanned. As some pictures are over or under exposed (or faded), it was necessary to make some allowance. It may be necessary to compensate for different scanning hardware which may be calibrated differently, in other systems.

The thresholds were chosen so that one third of the pixel elements in the picture were assigned to each of the three categories 0, 1 and 2. This was accomplished by computing a histogram of the pixel values in the digitized picture P(i,j) and by finding the levels which divided the distribution into approximately 3 equal parts.

The spatial distribution of all the pixels assigned to the zero category was analyzed. For example one can compute the mean, variance and correlation of the i and j-th spatial coordinates of all the pixels assigned to this category. (Recall that i and j address the row and column number of the pixels in the digitized picture.) The parameters that were used were the weighted averages of the i-th coordinate, the j-th coordinate and the product of the i-th and j-th coordinates. Two different weighting functions were used to obtain 6 averages—three for each weighting function.

The weighting functions serve two purposes. The first weighting function gives the pixels located in the central part of the picture more weight. For example, the face is usually centered in the picture and it is the component of the picture which is most difficult to modify without escaping detection. The weighting function also serves the purpose of making it more difficult for someone to tamper with the image in order to get a specific set of six spatial parameters.

The weighting functions were based on the harmonic functions sine and cosine. The first weighting function represents the first half of the sine wave (from zero to 180 degrees). The second weight function represents the full sine wave from zero to 360 degrees. Hence the second weighting function is non-symmetric across the image and contains negative weights. To compute the weights the i-th and j-th coordinates were converted to two angles by dividing them by 64 (the weight of the picture) and then multiplying them by 180 or 360.

The averages of the i-th and j-th coordinates must lie in a fixed range (−64 to +64). In actual practice it was found that they lie in a smaller range. The average of the i*j-th product is divided by 20 to confine them to a smaller workable range. In fact, each of these parameters can be encoded in a single 8 bit byte. There are 12 parameters, so 96 bits were used to encode the characteristics of the image.

In the instrument creation process, the fixed number, which is a digitized descriptor of the photograph (and/or personal signature if used), is then combined with the digitized personal information or code resulting from the hash function processed personal information, is encrypted and is fixed to the card in area 3 in e.g. one of the forms shown in FIGS. 2–5.

If the process is being used at an authentication station, the square Euclidean distance is computed between the decoded information obtained from area 3 and the image descriptor generated from the digitized image of area 2 of the personal identification instrument, which has been read by the authentication system.

The square Euclidean distance is then compared with a threshold limit, in order to provide an accept or reject indication of the instrument as being genuine or fake, e.g. as on display 15 or by other means.

The security code can contain combined data from areas 1 and 2 of the instrument into the security code or from either. Indeed, the instrument can carry only area 1 or 2 data, and the area 2 data can be comprised of the image descriptors of the whole instrument, whatever imprint is carried thereon.

Using the present invention no communication is required between the authentication and a central database. The cost of the authentication stations are relatively low, and being only as complex as present day widely-available personal computers. The personal identification instruments are virtually immune from tampering and falsification, and have been found to be very robust in testing, showing a very low false-negative and false-positive instance.

In accordance with another embodiment of the invention, a personal identification instrument is created in which a photo of the legitimate holder is incorporated with biographical data into an encoded, encrypted file. The image is first digitized and compressed into a file which can reproduce a recognizable likeness in about 900 bytes of data. The biographical data is appended to the image forming a file of about 1000 bytes. Error correction bits are added producing a file of about 1400 bytes. The file is encrypted using the secret key of a public key encryption scheme in which the key used is about 600 bits. The encrypted data is printed on a carrier 19 as a matrix 20 of black and white rectangles, using a laser printer, representing the binary number, as shown in FIG. 6. The 1400 bytes of data, and thus the printed area, can occupy an area of about 6 to 8 square inches. No photograph is printed on the carrier, nor biographical data although it may be desired to imprint the owner's name in some circumstances.

To check authenticity, a verification station is used. The verification station is comprised of a scanner connected to a desk top computer. The matrix 20 is first scanned into the computer and converted to a binary number. Next, an error correction procedure is applied to remove scanning errors. This process will overcome disfigurement of the matrix due to usage (e.g. discoloration due to handling, pencil marks and staple holes). The error corrected file now is comprised of about 1000 bytes, which is then decrypted using the public key. The information after decryption is displayed on the monitor of the computer. The displayed likeness of the legitimate holder and the displayed biographical data can be used to check against the person to ensure authenticity.

Forgery and tampering with the photo or the data contained in the matrix is not possible unless the secret key is known to the forger.

A person understanding this invention may now conceive of alternative structures and embodiments or variations of the above. All of those which fall within the scope of the claims appended hereto are considered to be part of the present invention.

We claim:

1. A method of creating a personal identification instrument on which personal data and at least one of a picture and signature of a legitimate holder are retained, comprising the steps of:

(a) acquiring a first digital representation of at least one of a picture and signature of said legitimate holder of said instrument, (b) extracting first feature data from said digital representation, (c) combining said feature data with said personal data into a single data sequence, (d) generating a security code by encrypting said single data sequence using a private secret key of a kind for which decrypting using a public key would allow authentication of the instrument, and (e) affixing the personal data, and said at least one of a picture and a signature of a legitimate holder and said encrypted security code to the instrument to provide a substantially forgery-proof instrument.

2. A method as defined in claim 1, in which the security code is fixed to the instrument in at least one of a machine readable bar code, a machine readable magnetic stripe, a machine readable integrated circuit and an OCR code.

3. A method as defined in claim 1 in which said first feature data is a code resulting from the low resolution luminance component of said picture reduced to a small number of gray levels.

4. A method as defined in claim 1, in which said feature data is a low resolution luminance component of a picture reduced to a small number of grey levels.

5. A method as defined in claim 4, in which the number of grey levels is three.

6. A method as defined in claim 4 in which the feature data is comprised of the binary coded weighted averages of each of the grey levels for each of i-th and j-th coordinates of the picture, more weight being given to pixels at the center of the picture.

7. A method as defined in claim 1 in which said security code is comprised additionally of error correction bits.

8. A method of authenticating a personal identification instrument comprising a substrate, and carried on the substrate: a photograph and a personal signature, readable personal information relating to the legitimate holder of the instrument, and a private secret key encrypted machine readable security code, the private secret key being of a kind for which decrypting using a public key would allow authentication of the instrument, said code being comprised of a combination of a digitized form of said personal information and a digitized descriptor of a first feature data of said photograph, comprising:

i reading said personal data from the personal identification instrument, ii acquiring a second digital representation of the photograph from said instrument, iii extracting second feature data from the digitized representation corresponding to said first feature data of said photograph, iv processing the second feature data to obtain image descriptors, v reading and decrypting the security code using a public decryption key, vi separating personal data from feature data in the encrypted security code, vii comparing the personal data obtained in step vi with the personal data read in step i, viii in the event there is a discrepancy, between the personal data from step vi compared to step i, declaring the instrument as a fake, ix in the event the instrument is not declared as a fake in step viii, obtaining decrypted image descriptors from the decrypted security code and comparing decrypted feature data descriptors obtained in step iv with the decrypted image descriptors, x declaring the instrument as a fake in the event the compared descriptors in step ix and step iv are dissimilar to a predetermined degree.

9. A method as defined in claim 8 in which said machine readable security code is comprised of a compressed digitized representation which has been encrypted.

* * * * *